(12) United States Patent
Keese

(10) Patent No.: US 7,770,468 B2
(45) Date of Patent: Aug. 10, 2010

(54) MAGNETIC INDUCTION FLOWMETER HAVING A PLASTIC MEASURING TUBE

(75) Inventor: Dieter Keese, Wahlsburg (DE)

(73) Assignee: ABB AG, Mannheim (DE)

( * ) Notice: Subject to any disclaimer, the term of this patent is extended or adjusted under 35 U.S.C. 154(b) by 0 days.

(21) Appl. No.: 12/289,569

(22) Filed: Oct. 30, 2008

(65) Prior Publication Data

US 2009/0056471 A1  Mar. 5, 2009

Related U.S. Application Data

(62) Division of application No. 11/709,228, filed on Feb. 22, 2007, now abandoned.

(30) Foreign Application Priority Data

Feb. 23, 2006  (DE) .................. 10 2006 008 433

(51) Int. Cl.
*G01F 1/58* (2006.01)
(52) U.S. Cl. .................. 73/861.12; 73/861.11
(58) Field of Classification Search .. 73/861.08–861.16
See application file for complete search history.

(56) References Cited

U.S. PATENT DOCUMENTS

| | | | | |
|---|---|---|---|---|
| 3,924,466 A | * | 12/1975 | Medlar | 73/861.12 |
| 4,253,340 A | * | 3/1981 | Schmoock | 73/861.12 |
| 4,614,121 A | * | 9/1986 | Hansen et al. | 73/861.12 |
| 4,635,486 A | * | 1/1987 | Jacobsen et al. | 73/861.12 |
| 4,914,950 A | * | 4/1990 | Uematsu et al. | 73/861.12 |
| 5,113,690 A | | 5/1992 | van Nistelrooij et al. | |
| 5,307,687 A | * | 5/1994 | Arai et al. | 73/861.12 |
| 5,458,003 A | * | 10/1995 | Ishihara et al. | 73/861.12 |
| 5,526,698 A | * | 6/1996 | Sakurai et al. | 73/861.12 |
| 5,664,315 A | | 9/1997 | Unterseh | |
| 5,852,362 A | | 12/1998 | Batenburg et al. | |
| 5,925,830 A | | 7/1999 | Schalk | |
| 7,137,307 B2 | | 11/2006 | Huybrechts et al. | |
| 2005/0183514 A1 | | 8/2005 | Huybrechts et al. | |
| 2005/0199073 A1 | | 9/2005 | Keech et al. | |

FOREIGN PATENT DOCUMENTS

| | | |
|---|---|---|
| DE | 37 30 641 A1 | 3/1989 |
| DE | 03 47 890 A1 | 5/2005 |

OTHER PUBLICATIONS

J. Webster (ed.), "Flowmeters", Wiley Encyclopedia of Electrical and Electronics Engineering, Copyright 1999, John Wiley & Sons, Inc., pp. 607-620.

* cited by examiner

*Primary Examiner*—Lisa M Caputo
*Assistant Examiner*—Jonathan Dunlap
(74) *Attorney, Agent, or Firm*—Buchanan Ingersoll & Rooney PC

(57) ABSTRACT

A magnetic induction flowmeter has a plastic measuring tube (1), which can be inserted into a pipeline system, having at least two mutually opposite measuring electrodes (3) introduced into the wall of the measuring tube (1) in order to register a measuring voltage, a magnetic unit (2), likewise arranged on the outside of the measuring tube (1), generating a magnetic field aligned substantially at right angles to the flow direction of the conductive flow medium to be measured. The plastic measuring tube (1) is equipped with means for diverting axial and thrust forces which act from the outside on the measuring tube (1) inserted into the pipeline system, in order to keep destructive mechanical loadings away from the measuring tube (1).

4 Claims, 2 Drawing Sheets

MAGNETIC INDUCTION FLOWMETER HAVING A PLASTIC MEASURING TUBE

CROSS REFERENCE TO RELATED APPLICATIONS

The present application is a divisional of, and claims priority under 35 U.S.C. §120 to, U.S. patent application Ser. No. 11/709,228, which was filed on Feb. 22, 2007 now abandoned, which claimed priority under 35 U.S.C. §119 to German Application 10 2006 008 433.0 filed in Germany on 23 Feb. 2006, the entire contents of each of the above-mentioned applications are hereby incorporated by reference in their entireties.

FIELD

A magnetic induction flowmeter having a plastic measuring tube is disclosed, which can be inserted into a pipeline system, having at least two mutually opposite measuring electrodes introduced into the wall of the measuring tube in an electrically insulated manner in order to register a measuring voltage, and a magnetic unit, likewise arranged on the outside of the measuring tube, generating a magnetic field aligned substantially at right angles to the flow direction of the conductive flow medium to be measured.

BACKGROUND INFORMATION

A magnetic induction flow meter is used as a flow meter for liquids, pulps and pastes which have a specific minimum electric conductivity. This type of flowmeter is distinguished by quite accurate measured results, no pressure loss in the pipeline system being caused by the measurement. In addition, magnetic induction flowmeters have no parts which move or project into the measuring tube and which, in particular, are subject to wear. The area of use of the flowmeters of interest here extends primarily to applications in the chemical industry, pharmaceuticals and the cosmetic industry, and also the communal water and effluent business as well as the foodstuffs industry.

Faraday's induction law forms a physical basis of the measuring method of a magnetic induction flowmeter. This natural law states that a voltage is induced in a conductor moving in a magnetic field. During the utilization of this natural law for measurement, the electrically conductive medium flows through a measuring tube in which a magnetic field is generated at right angles to the flow direction. The voltage induced in the medium is picked up by an electrode arrangement. Since the measuring voltage obtained in this way is proportional to the average flow velocity of the flowing medium, the volume flow of the medium can be determined from it. In addition, by taking account of the density of the flowing medium, its mass flow can also be determined.

Measuring tubes of such magnetic induction flowmeters are primarily composed of metal and, in order to implement the measuring principle, are provided with internal electrical insulation. In addition, there also exist plastic measuring tubes, in which it is usually possible to dispense with additional internal electrical insulation. The present disclosure relates to the last-named type of measuring tubes.

DE 103 47 890 A1 reveals a generic magnetic induction flowmeter whose measuring tube is composed of plastic. In order to produce the measuring tube, a fiber composite material is used. The measuring electrodes that contact the substance to be measured are composed of metal plates, which are placed on a core and are subsequently enveloped by the first wound layers of the fiber composite material. After the wound layers have been cured, the core is removed, so that the measuring electrodes are given contact with the conductive flow medium. The surface structure of the measuring tube can be configured within wide limits because of the winding technique. For example, molded-on portions can be produced in the end region of the measuring tube in order to achieve the largest possible sealing areas. The magnetic unit is preferably embedded completely within the wall of the measuring tube and is therefore accommodated therein in a protected manner.

The wall thickness of the measuring tube consisting of plastic has to be dimensioned in such a way that the material withstands the external mechanical loadings. Disruptive external mechanical loadings are produced, for example, by the pipeline into which the measuring tube is inserted. Thus, depending on the installation situation, disruptive mechanical influences in the form of axial forces and/or thrust forces can occur on the measuring tube and, in the extreme case, can lead to cracking or even to fracture of the measuring tube.

Although these problems can be counteracted by an appropriate material selection and also by generous dimensioning of the wall thickness, this is often associated with considerable expenditure on material and fabrication.

SUMMARY

A plastic measuring tube of a magnetic induction flowmeter is disclosed to the effect that, by using simple means, destructive mechanical loadings can be kept away from the measuring tube.

An exemplary plastic measuring tube is equipped with means for diverting axial and thrust forces which act from the outside on the measuring tube inserted into the pipeline system.

By using the force deflection means, which are additional to this extent, destructive mechanical loadings can be managed in a simple way. In this case, in the design of the measuring tube itself, the loadings acting from the pipeline system can remain disregarded. This is because these loadings are substantially kept away from the measuring tube by the additional means for force deflection. The measuring tube itself merely has to withstand other loadings which, for example, are produced by pressure and temperature of the flow medium flowing through. As a result, the measuring tube itself can be quite thin-walled and therefore save material. Accordingly, a low inherent mass can be achieved.

Suitable means for diverting the axial and thrust forces can be a metal tube surrounding the measuring tube at a distance and, at least at the end, connected to the measuring tube. As an alternative exemplary embodiment, instead of a closed metal tube for force diversion, to use individual rod elements arranged at a distance from one another and from the measuring tube. Furthermore, it is also possible to surround the measuring tube with a casting compound made of a pourable material with adequate mechanical loadbearing ability. In this case, this casting compound can either be applied directly to the outside of the measuring tube or likewise at a distance from the latter.

According to a further exemplary embodiment, the end connection can be produced via an annular disk in each case which is arranged at the end of the measuring tube and which is fixed radially internally to the measuring tube and radially externally to the metal tube or the rod elements or the like. To this extent, the rod elements themselves can be rectilinear and can run parallel to the measuring tube axis. Thus, starting from one end of the measuring tube, the force flow runs via the annular disk arranged here, then via the metal tube or the rod elements or the like to the other annular disk and from there into the pipeline leading onward. The measuring tube itself is thus freed to the greatest extent from the disruptive mechanical loadings.

The annular disks to be used in conjunction with the metal tube or the rod elements within the context of the means for diverting the axial and thrust forces can be produced from a rigid plastic or from a metal. In the latter case, a particularly high mechanical loadbearing ability can be achieved with relative low material thicknesses. However, an annular disc produced from metal must be fixed to the outside of the measuring tube so as not to contact the substance to be measured. This is because, by means of this measure improving the exemplary embodiment further, it is possible to ensure that disruptive electric potentials are not passed on to the electrically conductive flow medium via the metallic annular disks.

The fixing of the annular disk to the outside of the measuring tube can be carried out cohesively by means of adhesive bonding or welding. If the annular disk is comprised of metal, this can be fixed to the plastic measuring tube in a straightforward manner by means of adhesive bonding. If a plastic annular disk is to be used, this can possibly be fixed by means of welding to the measuring tube, likewise can be comprised of the same plastic. Further alternative exemplary embodiments for cohesive fixings are also conceivable. As compared with other types of fixing, the exemplary types of fixing variously set forth above can be used because of the simple implementation in terms of fabrication.

The measuring tube comprised of plastic can be inserted detachably into the pipeline system, for example, via flanged sections at the ends. In addition, it is also conceivable, instead of the flanged sections, to insert the measuring tube into the pipeline system via a plug-in connection or the like. If flanged sections are used in order to produce a detachable connection of the measuring tube in the pipeline system, then it is recommended that these already partly be a constituent part of the annular disks. To this extent, the annular disks constitute a functionally integrated component.

BRIEF DESCRIPTION OF THE DRAWINGS

The disclosure will be illustrated in more detail below together with the description of the various exemplary embodiments and by using the figures, in which.

DETAILED DESCRIPTION

Figure 1:
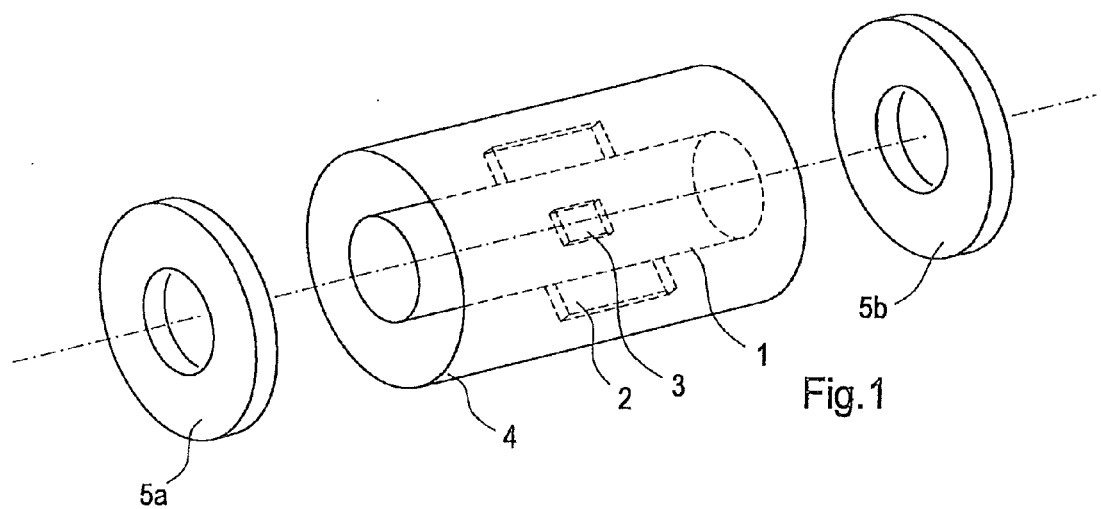
FIG. 1 shows an exploded illustration of a magnetic induction flowmeter in a first exemplary embodiment.

According to FIG. 1, the exemplary magnetic induction flowmeter illustrated schematically here has a plastic measuring tube 1. In this exemplary embodiment, the plastic used is polyether ketone (PEEA). Arranged on the outside of the measuring tube 1 is a magnetic unit 2, which generates a magnetic field aligned substantially at right angles to the flow direction of the conductive flow medium to be measured. The voltage induced in the flow medium in this way is registered via two measuring electrodes 3 introduced opposite each other into the wall of the measuring tube 1 and is then passed on to a signal processing device, not further illustrated.

The quite thin-walled measuring tube 1, comprising plastic, is also equipped with means for diverting external mechanical loadings, which primarily act via the pipeline system. In this exemplary embodiment, these means for diverting the axial and thrust forces causing loadings comprise a metal tube 4 surrounding the measuring tube 1 at a distance, which is fitted to the measuring tube 1 via annular disks 5a and 5b arranged at the ends. In this exemplary embodiment, the annular disks 5a and 5b are comprised of metal and are connected cohesively via adhesive bonds, radially internally to the measuring tube 1 and radially externally to the enclosing metal tube 4. The connection is implemented in such a way that the annular disks 5a and 5b are fixed to the outside of the measuring tube 1—not making contact with the substance to be measured.

Figure 2:
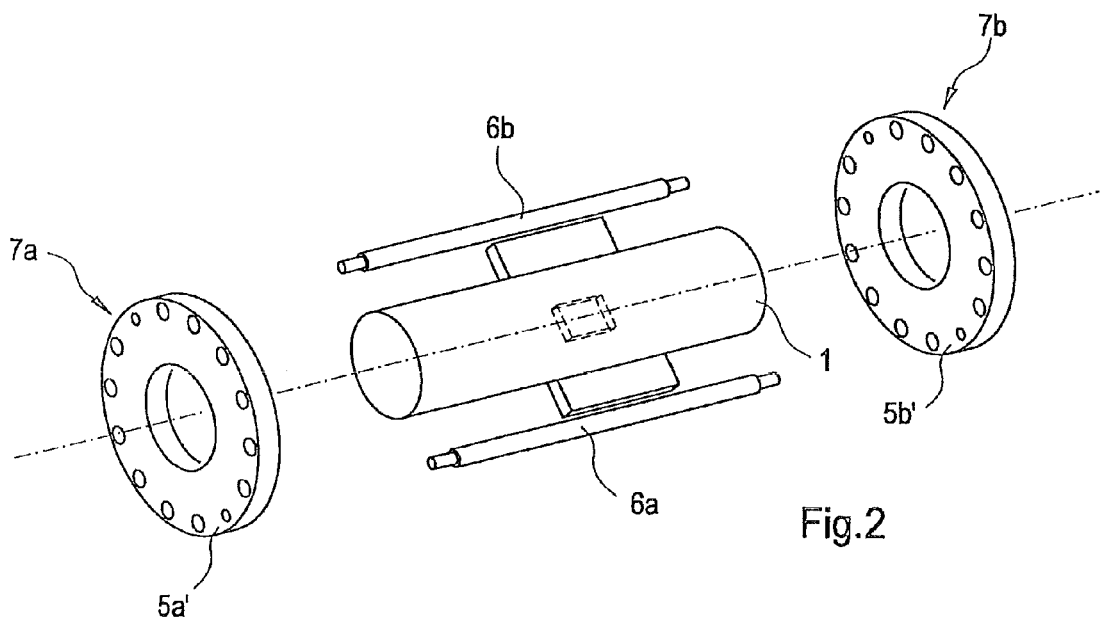
FIG. 2 shows an exploded illustration of a magnetic induction flowmeter in a second exemplary embodiment.

In the exemplary embodiment illustrated in FIG. 2, as distinct from the exemplary embodiment described above, instead of a metal tube a plurality of rod elements 6a and 6b are used, which form the force bridge between the two annular disks 5a' and 5b' arranged at the ends of the measuring tube 1. Furthermore, the two annular disks 5a' and 5b' likewise form flanged sections 6a and 6b for the detachable fixing of the magnetic induction flowmeter in the pipeline—not illustrated further. A flanged fixing of this type is via known screw connections. Otherwise, the construction of this exemplary embodiment corresponds to the construction of the exemplary embodiment described above.

Figure 3:
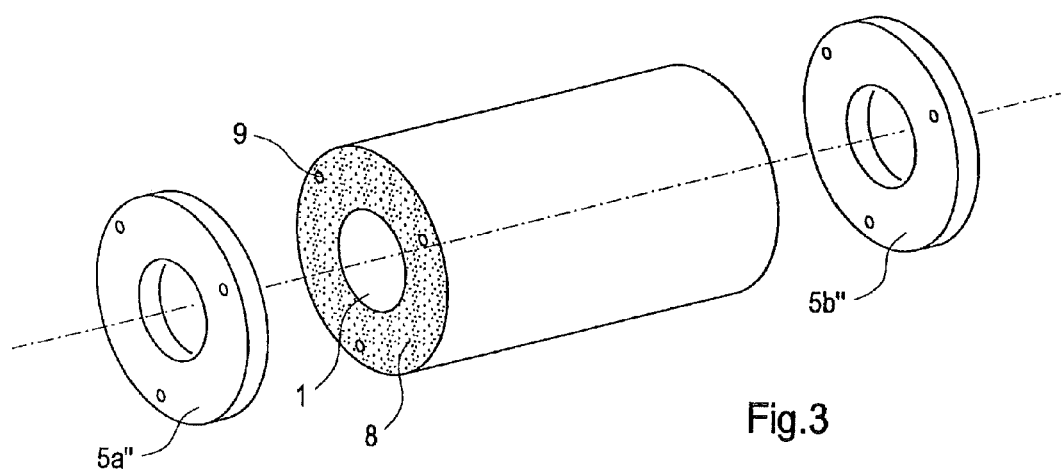
FIG. 3 shows an exploded illustration of a magnetic induction flowmeter in a third exemplary embodiment.

According to FIG. 3, in accordance with a further exemplary embodiment, the means for deflecting the axial and thrust forces loading the measuring tube 1 are a casting compound 8, which encloses the measuring tube 1 and the components fitted in and on the latter. The loadings acting from the outside are introduced into the casting compound 8 via annular disks 5a" and 5b" fitted to the measuring tube 1 at the ends. The casting compound 8 is formed as a plastic cast and is applied to the measuring tube 1 by being sprayed on. Glass fibers are embedded in the plastic in order to increase the mechanical strength. The two annular disks 5a" and 5b" are braced against the cured casting compound 8 via tie rods 9 arranged axially parallel to the measuring tube 1, so that the result overall is a stable unit. Otherwise, this exemplary embodiment corresponds to the exemplary embodiment described first.

The invention is not restricted to the exemplary embodiments described in detail above. Thus, means configured in other ways for diverting the disruptive axial and thrust forces are additionally conceivable. Instead of rod elements 6a and 6b running rectilinearly, curved rod elements can also be used which, dispensing with separate annular disks, are fitted directly to the measuring tube 1 at the ends. Overall, a flow meter formed in this way is given an approximately barrel-like shape.

LIST OF DESIGNATIONS

1 Measuring tube
2 Magnetic unit
3 Measuring electrodes
4 Metal tube
5 Annular disk
6 Rod element
7 Flanged section
8 Casting compound
9 Tie rod

The invention claimed is:

1. A magnetic induction flowmeter having a plastic measuring tube, which can be inserted into a pipeline system, having at least two mutually opposite measuring electrodes introduced into the wall of the measuring tube in order to register a measuring voltage, a magnetic unit, likewise arranged on the outside of the measuring tube, generating a magnetic field aligned substantially at right angles to the flow direction of the conductive flow medium to be measured, the plastic measuring tube comprising means for diverting axial and thrust forces which act from the outside on the measuring tube inserted into the pipeline system, in order to keep destructive mechanical loadings away from the measuring tube; and wherein the means for diverting the axial and thrust forces comprise a plurality of metal rod elements running along the measuring tube at a distance from the latter and at a common distance from one another such that they are symmetrically disposed about the measuring tube and, at least at the two ends of the measuring tube, connected to the measuring tube; wherein the end connection is produced via an annular disk arranged at each end of the measuring tube and which is fixed radially internally to the outside of the measuring tube so as not to contact the medium to be measured, and radially externally to the metal tube or the rod elements, and wherein the means for diverting the axial and thrust forces is adapted to transfer the axial and thrust forces between the two annular disks and isolate the measuring tube therefrom.

2. The magnetic induction flowmeter as claimed in claim 1, wherein the measuring tube is detachably inserted into the pipeline system via flanged sections on both sides.

3. The magnetic induction flowmeter as claimed in claim 1, wherein the annular disks are formed from metal.

4. The magnetic induction flowmeter as claimed in claim 3, wherein the measuring tube is detachably inserted into the pipeline system via flanged sections on both sides.

* * * * *